United States Patent [19]

Olsen

[11] Patent Number: 5,683,576

[45] Date of Patent: Nov. 4, 1997

[54] WATER OZONATION TREATMENT APPARATUS

[75] Inventor: Philip C. Olsen, Maple Grove, Minn.

[73] Assignee: Hew-Lyn, Inc., Rogers, Minn.

[21] Appl. No.: 549,577

[22] Filed: Oct. 27, 1995

[51] Int. Cl.$^6$ .............................. B01D 21/30; C02F 9/00
[52] U.S. Cl. .................. 210/138; 210/85; 210/86; 210/97; 210/142; 210/143; 210/195.1; 210/257.1; 210/221.2; 210/192; 210/760
[58] Field of Search ................... 210/192, 257.2, 210/56.1, 85, 86, 136, 134, 138, 142, 143, 110, 760, 221.2, 97, 220, 195.1, 257.1

[56] References Cited

U.S. PATENT DOCUMENTS

| | | | |
|---|---|---|---|
| 4,439,317 | 3/1984 | Jarrell | 210/151 |
| 4,595,498 | 6/1986 | Cohen et al. | 210/192 |
| 4,599,166 | 7/1986 | Gesslauer | 210/192 |
| 4,619,763 | 10/1986 | O'Brien | 210/192 |
| 4,650,573 | 3/1987 | Nathanson | 210/192 |
| 4,752,389 | 6/1988 | Burrows | 210/257.2 |
| 4,767,528 | 8/1988 | Sasaki et al. | 210/192 |
| 4,816,229 | 3/1989 | Jensen et al. | 422/186.2 |
| 5,246,587 | 9/1993 | Bam et al. | 210/257.2 |
| 5,397,480 | 3/1995 | Dickerson | 210/760 |
| 5,427,693 | 6/1995 | Mausgrover et al. | 210/192 |
| 5,451,314 | 9/1995 | Neuenschwander | 210/192 |

Primary Examiner—Ana Fortuna
Attorney, Agent, or Firm—Palmatier, Sjoquist, Helget & Voigt, P.A.

[57] ABSTRACT

The object of the present invention is a water treatment apparatus that integrates an ozone generator, CT and storage tanks and a microcontroller to treat water in accordance with proposed EPA test protocol under the Federal Insecticide, Fungicide and Rodenticicle Act (FIFRA). The present invention receives raw water from a municipal or private water supply, the water is passed through a pretreatment filter to the CT chamber where ozone is dissolved in the water to kill bacteria, viruses and other microorganisms. Ozone is manufactured in an ozone generator, pumped to the CT chamber where it is forced through a diffuser and past a sonic wave generator to increase the mass transfer efficiency of ozone into solution with water causing greater ozone surface area. A degassing and ozone destruct mechanism removes ozone enriched air from the CT chamber and destroys the ozone prior to release of the air into the environment. Water in the CT chamber is treated at a specified level of ozone concentration for a predetermined period of time to assure that microorganisms are killed. Treated water is pumped into a biologically static storage tank from which it is drawn upon demand. The storage tank is protected from airborne contaminants by a blanket of ozone enriched air. Water from the CT chamber pours through an ozone enriched air gap in the blanket, to the storage tank where it is held for dispensing. Water in the storage tank is recirculated into the CT chamber for retreatment when required due to recontamination.

20 Claims, 3 Drawing Sheets

WATER OZONATION TREATMENT APPARATUS

BACKGROUND OF THE INVENTION

The quality of water in homes and commercial buildings is a serious concern today. This concern has created a demand for water treatment apparatuses. Water treatment apparatuses use filters, chemicals and other methods to remove contaminants from water. Water may be contaminated with nonorganic and organic matter such as bacteria, viruses, germs and other microorganisms capable of causing or carrying disease. Filtration systems are used to remove specific contaminants such as particulate and large biological organisms. Chemical treatment systems are used to remove some biological microorganisms however, other microorganisms are immune to commonly accepted chemical treatment methods. Microbiological contaminants are removed from water supplies because such microorganisms may cause injury or death by causing or transmitting disease to a person who drinks untreated water from a municipal or private water supply.

It has been known that ozone is an effective tool for destroying microorganisms such as bacteria and viruses, even those that are immune to traditional chemical treatment systems. Ozone is used extensively in Europe for municipal water treatment. Ozone is also used to treat water at some locations in the United States for municipal and industrial water supplies.

Because of water contamination and concern over water quality, water treatment devices have been popular as appliances for residential use. However, prior art water treatment systems using ozone for residential point of use and point of entry have serious limitations. Point of entry is the point at which water from a municipal or private water supply enters a residential dwelling. Point of use is a location within the residential dwelling where water is dispensed such as a faucet in the bathroom or kitchen. Prior art designs for residential point of use and point of entry systems have not addressed problems with discharge of ozone into the environment or ozone in solution. Furthermore, the prior art designs do not assure an ongoing supply of properly treated water. The present invention is a residential point of use or point of entry water treatment system incorporating ozone and overcoming the problems in the prior art.

SUMMARY OF THE INVENTION

The object of the present invention is a water treatment apparatus that integrates an ozone generator, CT and storage tanks and a microcontroller to treat water in accordance with proposed EPA test protocol under the Federal Insecticide, Fungicide and Rodenticide Act (FIFRA). The present invention receives raw water from a municipal or private water supply, the water is passed through a pretreatment filter to the CT chamber where ozone is dissolved in the water to kill bacteria, viruses and other microorganisms. Ozone is manufactured in an ozone generator, pumped to the CT chamber where it is forced through a diffuser and past a sonic wave generator to increase the mass transfer efficiency of ozone into solution with water causing greater ozone surface area. A degassing and ozone destruct mechanism removes ozone enriched air from the CT chamber and destroys the ozone prior to release of the air into the environment. Water in the CT chamber is treated at a specified level of ozone concentration for a predetermined period of time to assure that microorganisms are killed. Treated water is pumped into a biologically static storage tank from which it is drawn upon demand. The storage tank is protected from airborne contaminants by a blanket of ozone enriched air. Water from the CT chamber pours through an ozone enriched air gap in the blanket, to the storage tank where it is held for dispensing. Water in the storage tank is recirculated into the CT chamber for retreatment when required due to recontamination.

A feature of the invention is a self-contained water treatment apparatus for point of entry and point of use applications.

Another feature of the invention is a recirculating system to retreat water that is in the storage tank and may have become recontaminated.

A further feature of the invention is a microcontroller that controls the water treatment apparatus.

Another feature of the invention is a water treatment apparatus having a treated water storage tank for storage of water available for dispensing.

A further feature of the invention is a degassing and ozone destruct mechanism to reduce ozone released into the atmosphere.

A further feature of the invention is the invention may be used in conjunction with pretreatment or posttreatment filters to further treat the water.

A further feature of the invention is a diffuser used to introduce ozone into untreated water causing a disbursement of free bubbles to dissolve ozone into solution. A still further feature of the invention is a sonic wave generator that further reduces the size of ozone bubbles in the water increasing the mass transfer efficiency of ozone into solution.

An advantage of the invention is an adjustable water treatment system adjusted to meet varying EPA standards for treating disinfected water.

Another advantage of the invention is a water treatment system that recirculates treated water to prevent recontamination.

Another advantage of the invention is that it is packaged for home use.

Another advantage of the invention is that it reduces the amount of ozone released into the atmosphere.

DETAILED SPECIFICATION

Figure 1:
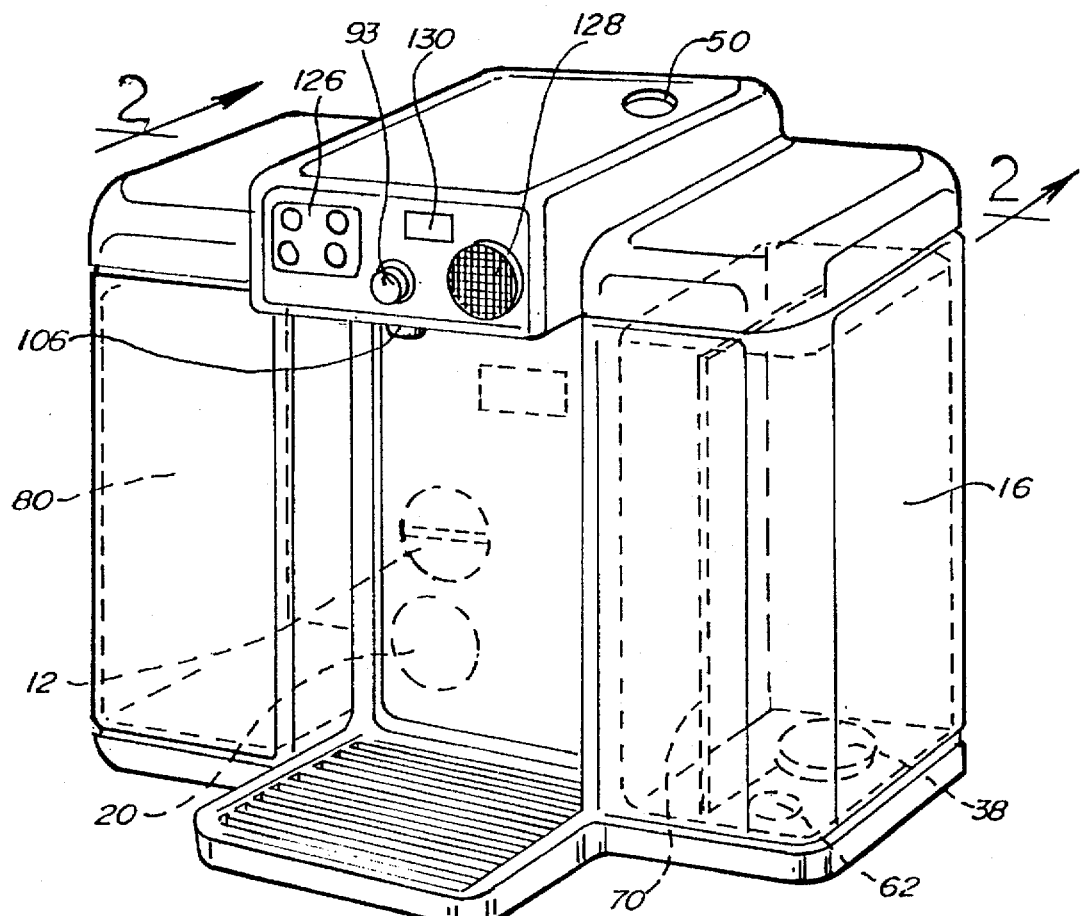
FIG. 1 is a perspective view of the water ozonation treatment apparatus.

FIG. 1 illustrates the water ozonation treatment apparatus indicated in general by the numeral 10. The water treatment apparatus 10 comprises a means for supplying ozone 12, a microcontroller 14, and a CT chamber 16. Raw water enters the CT chamber 16 where it is exposed to ozone enriched air from the means for supplying ozone 12 for a predetermined length of time measured by the microcontroller 14. Treated water is then available for additional treatment, filtering or dispensing for use by a consumer.

Figure 2:
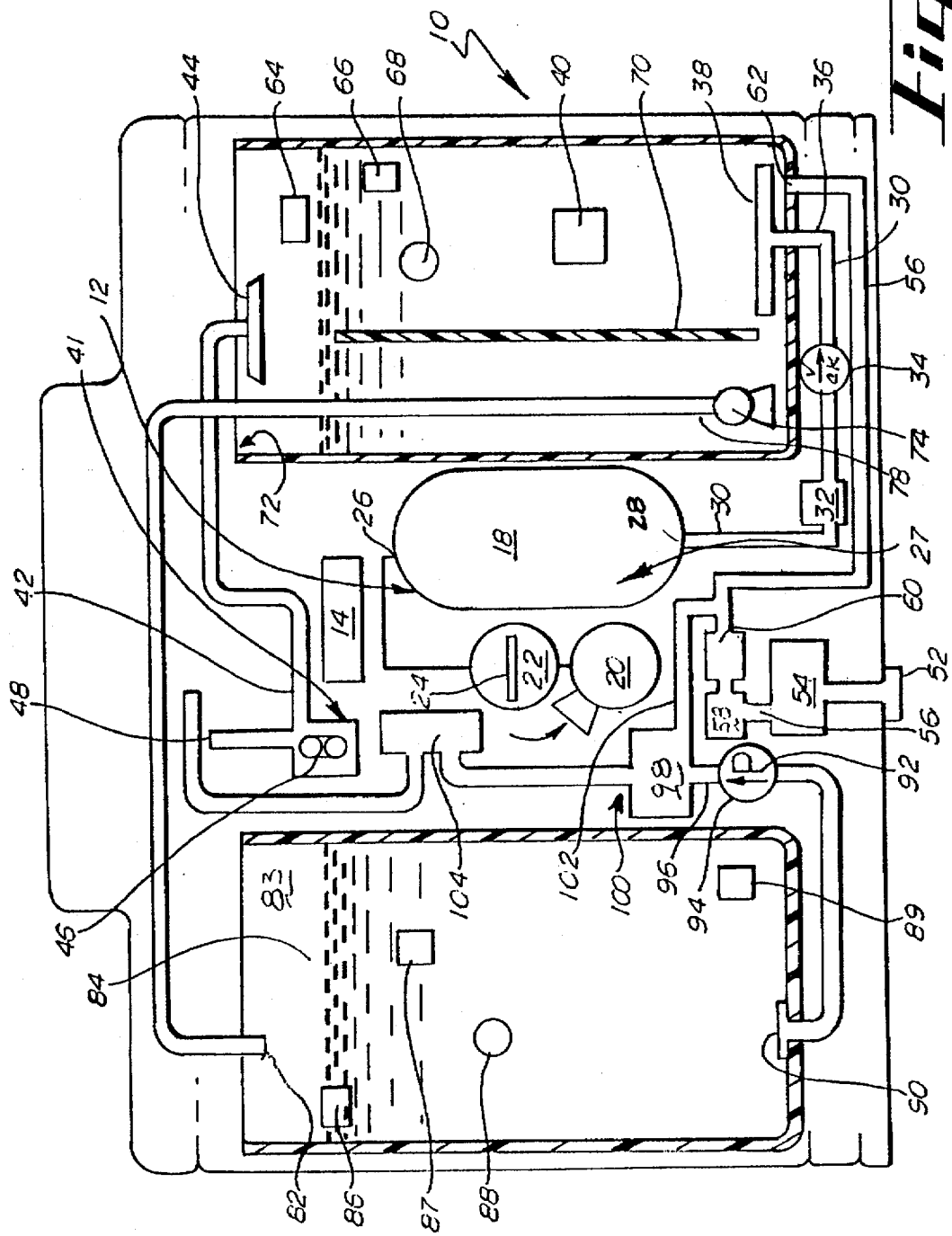
FIG. 2 is a detailed section view taken at approximately 2—2 of FIG. 1.
Figure 3:
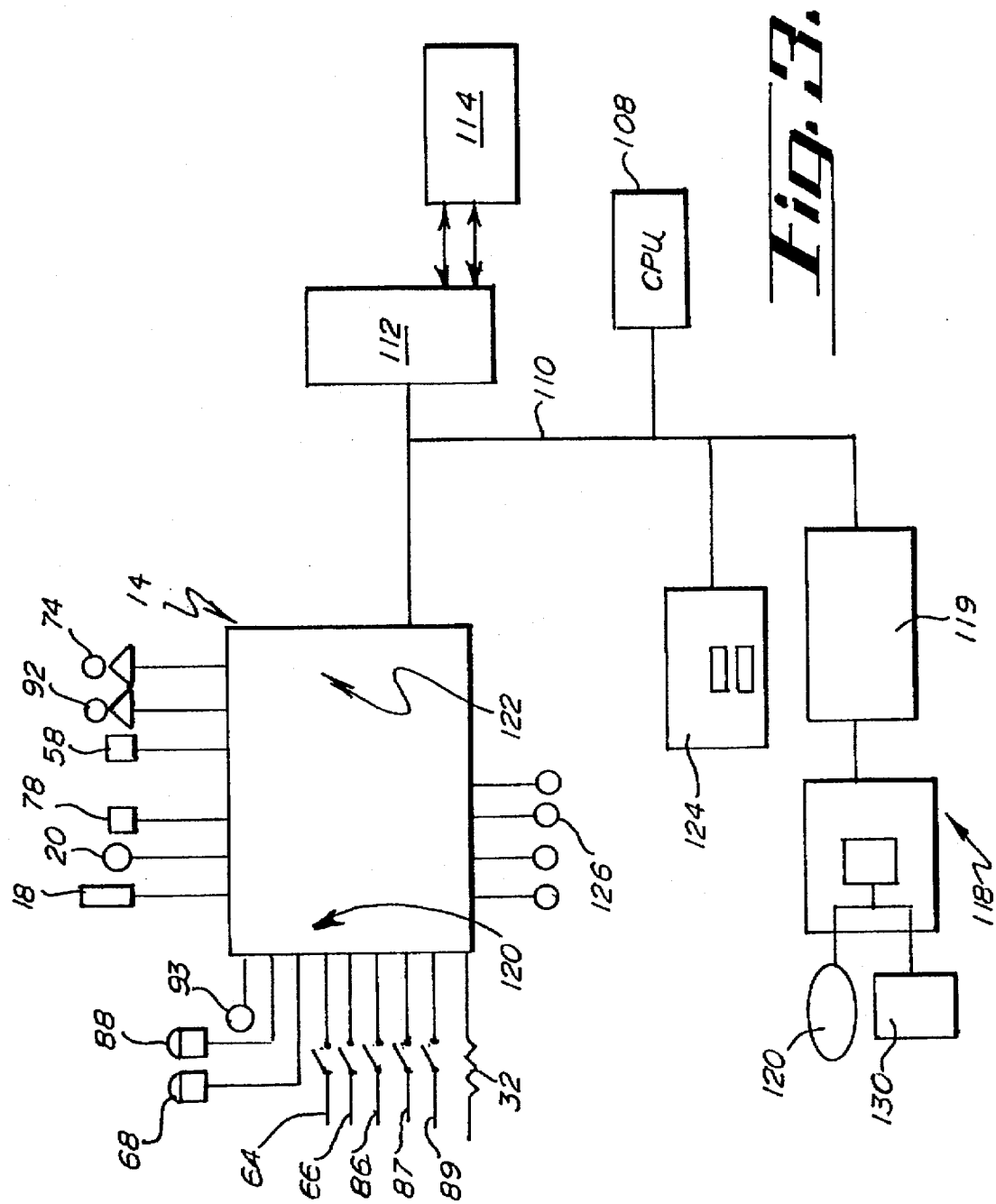
FIG. 3 is a blocked diagram of the microcontroller portion of the apparatus.

The means for supplying ozone 12 illustrated in FIG. 2, showing the preferred embodiment, comprises an ozone generator 18. This ozone generator 18 requires dry air to efficiently produce ozone enriched air for treating water. An air pump 20 takes in ambient air and pumps the air to air dryer 22. Air dryer 22 may be of the type disclosed in U.S. Pat. No. 4,816,229 which is assigned to a common assignee with Applicant's present invention. The contents of U.S. Pat. No. 4,816,229 are incorporated in the present application by reference. Air entering the air dryer 22 is dried by removing humidity. Air dryer 22 uses a means to remove humidity from the air such as a desiccant 24 of calcium sulfate or other drying agents well known in the art of air drying.

Air pumped from the atmosphere through the air dryer 22 passes to dry air inlet 26 connected to ozone generator 18. Dry air coming from dry air inlet 26 to ozone generator 18 is exposed to a means 27 to generate ozone such as a corona discharge device. Ozone is produced to form ozone enriched air. The ozone enriched air exits the ozone generator 18 at the ozone enriched air outlet 28. It should be understood, in the preferred embodiment ozone generator 18 is a commercially available ozone generator that may use an alternate ozone generating means 27 must produce ozone of a concentration greater than 0.5% by weight in air to effect disinfection. Furthermore, means for supplying ozone 12 may alternatively comprise ozone supplied from a remote source.

Ozone travels from the ozone enriched air outlet 28 to the CT chamber 16 through an ozone pipe 30. Ozone generator 18 must be protected from water coming from CT chamber 16 through ozone pipe 30. A water probe 32 is situated intermediate CT chamber 16 and ozone generator 18 in ozone pipe 30 to detect the presence of water. If water is detected by the water probe 32, ozone generator 18 will be disabled to minimize water damage. In addition, a check valve 34 is positioned in ozone pipe 30 intermediate water probe 32 and CT chamber 16. Check valve 34 is used to allow ozone enriched air to pass into CT chamber 16 while preventing water from entering ozone generator 18 through ozone pipe 30.

Ozone pipe 30 attaches to CT chamber 16 at ozone enriched air inlet 36. Means for supplying ozone 12 further comprises an ozone diffuser 38 attached to ozone inlet 36 to accept ozone enriched air from ozone generator 18 and disburse the air into fine bubbles. Ozone enriched air is directed by the force of gravity causing air to rise from air inlet 36 to air diffuser 38. The air diffuser 38 increases the surface area of ozone enriched air in the water to be treated helping transfer ozone into solution in the water. Ozone dissolved in solution will destroy microorganisms such as bacteria and viruses when these bacteria and viruses contact the ozone.

In the preferred embodiment, shown in FIG. 2, ozone generator 18 further comprises a sonic wave generator 40 positioned in the CT chamber 16 above air diffuser 38. Sonic wave generator 40 generates sonic waves and directs the waves into the water, containing fine bubbles of ozone, rising from air diffuser 38. The sonic waves disburse fine bubbles into microbubbles causing a greater mass transfer of ozone into solution. This further method of transferring ozone into solution increases the efficiency of the present invention and provides for greater water treatment capabilities in the CT chamber 16.

Ozone may also bubble to the top of CT chamber 16 without being transferred into solution. Furthermore, ozone in solution will naturally be released from solution and rise to the top of CT chamber 16. In the preferred embodiment, shown in FIG. 2, a degassing and ozone destroying device in the CT chamber 16 comprises a means for destroying ozone 41 in fluid communication with the inside of CT chamber 16 and the outside environment near the water treatment apparatus 10.

Means for destroying ozone comprises an ozone destroying device 42 connected to the top of CT chamber 16 by ozone removal inlet 44. Ozone enriched air is forced into ozone removal inlet 44 and through the ozone destroying device 42 by the rising of the water level in the CT chamber 16. Ozone is removed from CT chamber 16 to reduce the possibility of danger to people, plants or animals by ozone released from the water treatment apparatus 10.

Ozone destroying device 42 comprises a filtering means 43 to degas CT chamber 16 and destroy ozone using an element such as activated carbon. The ozone destroying device 42, in the preferred embodiment, comprises a replaceable cartridge type device 46 of activated carbon. Air is then released to the environment through treated air outlet 48 which extends from ozone destroying device 42 to air discharge 50 shown in FIG. 1, in the back of the water treatment apparatus 10. It should be understood, ozone destroying device 42 may alternatively comprise an ultraviolet lamp or an element of a compound such as manganese oxide or other means for destroying ozone as is well known in the art.

Raw water from a municipal or private water supply (not shown) is connected to raw water inlet 52. In the preferred embodiment shown in FIG. 2, pretreatment filter 54 is connected to raw water inlet 52 to remove specific contaminants from the raw water prior to entering the CT chamber 16. Raw water exits pretreatment filter 54 at prefilter tube 56. A raw water solenoid valve 58 is mounted in prefilter tube 56 to control water flow from the water supply to the CT chamber 16. The raw water solenoid valve 58 is preferably of stainless steel and has an open position allowing water to flow through prefilter tube 56 and a closed position that prevents water flow from pretreatment filter 54 to CT chamber 16. Flow control orifice 60 is mounted in prefilter tube 56 to control flow rate of water from water supply to CT chamber 16. Water entering CT chamber 16 must pass through flow control orifice 60 mounted in prefilter tube 56. Prefilter tube 56 enters and connects to CT chamber 16 at CT chamber water inlet 62. In the preferred embodiment illustrated in FIG. 2, CT chamber water inlet 62 is positioned below air diffuser 38 and directs water toward air diffuser 38 to increase mass transfer efficiency of ozone into solution.

Raw water enters CT chamber 16 through CT chamber water inlet 62 until the water level reaches a CT full switch 64. CT full switch 64 is a float switch commonly used for water level sensing. It should be understood that CT full switch 64 may be a capacitance or other type switch used to detect a water level and generate an electrical signal. CT full switch 64 is connected to a power supply (not shown). When the water level in CT chamber 16 reaches a predefined position, CT full switch 64 closes a circuit to generate an electrical signal. The electrical signal is conveyed to microcontroller 14. The electrical signal from CT full switch 64 is used to stop water entering at water inlet 62 by closing valve 58. Recirculation level switch 65 is used to accommodate additional water in the CT chamber 16 during a recirculation cycle. CT low level switch 66 detects the water level reaching a low point in CT chamber 16. CT low level switch 66 sends an electrical signal to microcontroller 14 causing water to flow to CT chamber 16 by opening valve 58 or initiating a recirculating sequence.

In the preferred embodiment, illustrated in FIG. 2, CT chamber 16 also comprises a CT ozone sensor 68 used to detect the level of ozone in solution in CT chamber 16. CT ozone sensor 68 is connected to microcontroller 14. When a predetermined level of ozone in solution in CT chamber 16 is defected by CT ozone sensor 68, a signal is sent to microcontroller 14 which begins a CT timer to measure the length of time water in the CT chamber is exposed to ozone of a predetermined concentration in solution. The specific concentration of ozone in solution and the time the water is treated is predefined and controlled by the microcontroller 14. Concentration/time (CT) measurements used to remove microorganisms from water for point of entry and point of use water treatment systems may vary. In the preferred embodiment, water treatment apparatus 10 may be adjusted to accommodate different CT test values for different environmental conditions or regulations.

A baffle 70 is mounted in the CT chamber 16 to circulate water. Water entering at the CT chamber water inlet 62, rises in the CT chamber 16 as ozone enriched air floats to the top of the CT chamber. Baffle 70 is positioned vertically adjacent air diffuser 38 on side walls 71 of CT chamber 16 so water may flow under and over baffle 70. Rising water in CT chamber 16 will flow over baffle 70 causing water to flow downward in CT chamber 16 on the side of baffle 70 opposite air diffuser 38. This circular motion provides for efficient mixing of water in CT chamber 16 and increases the mass transfer of ozone into solution. Treated water outlet 72 transfers treated water from CT chamber 16. Treated water outlet 22 comprises CT pump 74, treated water feed 76 and treated water discharge 78. CT pump 74 takes water in through treated water feed 76 and transfers water out of CT chamber 16 through treated water discharge 78.

In the preferred embodiment shown in FIG. 2, water treatment apparatus 10 also comprises treated water storage tank 80. It should be understood, water treatment apparatus may dispense treated water directly from CT chamber 16 at treated water outlet 72. The use of treated water storage tank 80 allows greater efficiency in the operation of the present invention. Treated water enters treated water storage tank 80 through treated water inlet 82 connected to treated water discharge 78. Treated water inlet 82 is in an ozone enriched air blanket 83 and is separated from the water in the storage tank by an ozone enriched air gap 84. It should be understood, ozone removal inlet 44 should be placed so ozone air gap 84 is not destroyed. This ozone enriched air gap 84 is an important element of the invention. Treated water coming from CT chamber 16 into treated water storage tank 80 will rise to a level where storage tank full switch 86 detects the water level.

Storage tank full switch 86 generates an electrical signal when the water level drops below this predetermined position. Storage tank full switch 86 electrical signal is used to stop CT pump 74. Treated water storage tank 80 also has storage tank low level switch 87 to generate an electrical signal when water level passes below a predetermined position. This storage tank low level switch 87 electrical signal is used to signal CT pump 74 to transfer treated water from CT chamber 16 to treated water storage tank 80. Storage tank full switch 86 and storage tank low level switch 87 are of a type similar to CT full switch 64.

In the preferred embodiment shown in FIG. 2, treated water storage tank 80 also has treated water ozone sensor 88. Treated water ozone sensor 88 is used to determine the level of ozone in solution in treated water held in treated water storage tank 80. Microcontroller 14 receives a signal from treated water ozone sensor 88 when the ozone in solution drops below a certain predetermined level. The signal from treated water ozone sensor 88 indicates water in treated water storage tank 80 is in need of retreatment. Retreatment of water in water storage tank 80 may also be calculated based on time. Microcontroller 14 is used to calculate the time water has been in water treatment storage tank 80. Storage tank empty switch 89 is a water level switch similar to CT full switch 64. Storage tank empty switch 89 generates an electrical signal to microcontroller 14 when the water level in treated water storage tank 80 has reached a predetermined critical level.

Treated water storage tank 80 further comprises a water dispensing spout 90 used to dispense water from treated water storage tank 80 for use or consumption. Water dispensing spout 90 is connected to dispensing pump 92. Dispensing switch 93 generates an electrical signal to microcontroller 14. Microcontroller 14 controls dispensing pump 92 to transfer water from treated water storage tank 80. Dispensing switch 93 may be a mechanical or capacitive switch for manual operation or alternatively may be an automatic switch controlled from an external device (not shown). Dispensing pump 92 draws water from dispensing spout 90 into dispensing feed 94. Water is pumped through dispensing pump 92 and exits at dispensing tube 96.

Water treatment apparatus 10 further comprises a recirculating valve 98 mounted in dispensing tube 96 to direct water from dispensing pump 92 to treated water exit 100 or alternatively, to direct water to recirculating pipe 102. The recirculating pipe 102 has a first end connected to the recirculating valve 98 and a second end in fluid communication with raw water inlet 62. Recirculating valve 98 is controlled by means for controlling 14 to recirculate water from treated water storage tank 80 when retreatment is necessary. It should be understood, water treatment apparatus 10 may alternatively include an additional recirculating pump or other means to move water from treated water storage tank 80 to CT chamber 16.

Treated water exit 100 further comprises a posttreatment filter 104 intermediate recirculating valve 98 and water spigot 106. Water flowing from treated water tank 80 through recirculating valve 98 to water spigot 106 passes through posttreatment filter 104 where additional contaminants are removed. Post treatment filter 104 will comprise a filter media known in the art of water filtering. The filter media will be selected based on the quality and characteristics of the incoming raw water. It should be understood, posttreatment filter 104 may alternatively be placed in treated water outlet 72 or at any location intermediate treated water outlet 72 and water spigot 106.

Microcontroller 14 comprises a microcontroller processing unit 108 connected by microcontroller bus 110 to a memory block 112, power control circuitry 114, microcontroller input/output section 116 and remote connection 118. The microcontroller processing unit 108 is a digital computer central processing unit (CPU) which provides overall system control of the water treatment apparatus 10. Instructions for operation of the water treatment apparatus 10 are loaded into microcontroller memory 112 through remote connection 118.

Figure 4:
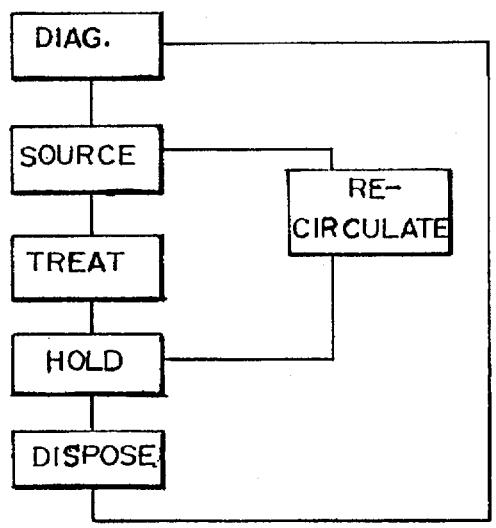
FIG. 4 is a flow chart that shows how the microcontroller controls the water ozonation treatment apparatus.

These instructions are retained in microcontroller memory 112 and used to operate the water treatment apparatus generally as indicated in the flow chart in FIG. 4. Ozone sensors 68, 88, dispensing switch 93, float switches 64, 66, 86, 87, and 89 and water probe 32 are connected to the input section 120 and power supply (not shown). Pumps 74, 92, valves 58, 98, air pump 20 and ozone generator 18 are connected to the output section 122. Signals coming into the input/output 116 are transferred to the microcontroller processor unit 108 that uses instructions stored in microcontroller memory 112 to turn on or off elements connected to the output section 122.

Timer 124 is used to provide timing functions for the water treatment apparatus 10. Timing functions include the time water is treated in the CT chamber 16 after CT ozone center 68 detects a predetermined level of ozone in solution; the time water is held in the treated water storage tank 80; and the time air dryer 22, ozone generator 18 and ozone destroying device 42 have been in operation to schedule preventive maintenance and assure efficient operation of the water treatment apparatus 10.

Instructions in the microcontroller memory 112 are also used to automatically shut the water treatment apparatus 10 off if water is not dispensed in a predefined period of time or after a number of recirculations. Instructions also perform diagnostics on the water treatment apparatus 10 and use diagnostic lights 126 to indicate operational status. Diagnostic lights 126 are attached to microcontroller input/output section 116. Status diagnostic lights 126 indicate status conditions such as disinfection cycle engaged, purified water available, system check, and change air dryer. Alternatively, water treatment apparatus 10 may be controlled by a means for controlling comprising electronic, electrical or mechanical devices well known in the art of control systems.

Remote connection 118 is used to connect an outside device like a computer(not shown) to the microcontroller 14. This connection may be used for diagnosing problems in the water treatment apparatus and reprogramming the instructions of the microcontroller. Remote connection 118 is connected to microcontroller processing unit 108 by microcontroller bus 110. Remote connection 118 comprises a full duplex serial interface 119 for translating signals from a computer (not shown) to the means for controlling 114.

An acoustic coupler 128 and a standard RJ11 phone connection 130 are connected to the remote connection 118 in the preferred embodiment to facilitate the use of phone lines with the microcontroller 14. A modem may be used to connect a computer to the remote connection 118. Phone connection 130 is of the type commonly used in commercial or residential buildings for connection to a standard phone system. Alternatively, the remote connection 118 may comprise a serial port, an RF or infrared connection or other connection means well known in the art of connecting computers and peripherals As shown in FIG. 4, the operation of the water treatment apparatus 10 begins with diagnostics of the microcontroller processing unit 108. The source of water to be treated is selected from either an outside source or the treated water storage tank 80. The water to be treated is transferred to the CT chamber 16 where it is treated with ozone from the ozone generator 18. After treatment the CT pump 74 transfers water from the CT chamber 16 to the treated water storage tank 80 where it is held for dispensing. If treated water is held for a predetermined period of time, it is assumed the water has become reinfected. The microcontroller 14 then controls the recirculation valve to make the treated water storage tank 80 the source of water. Treated water may be dispensed from the treated water storage tank 80.

In operation, water treatment apparatus 10 is connected to a source of raw water at raw water inlet 52. A signal from CT low level switch 66 causes water to enter CT chamber 16. Air pump 20 begins to pump air into air dryer 22. Dry air is transferred to ozone generator 18 at dry air inlet 26. Air pump 20 pumps for a short while to purge ambient air from air dryer 22 and generator 18. Ozone generator 18 is started by a signal from microcontroller 108 and generates ozone of at least 0.5% concentration by weight. Ozone enriched air is dispensed into CT chamber through air diffuser 38. Raw water enters CT chamber toward CT chamber water inlet 62 and is directed toward air diffuser 38 where ozone is transferred into solution in the water. Water continues to flow through raw water solenoid valve 58 until CT full switch 64 signals that CT chamber 16 is full of water. Ozone continues to be dispensed through air diffuser 38 causing a circulation of water in CT chamber 16 around baffle 70.

Microcontroller 14 determines when water in CT chamber 16 has been treated for a sufficient period of time at a predetermined concentration of ozone. Ozone concentration is measured by CT ozone sensor 68 and begins the timer 124 timing the length of time water in the CT chamber 16 is treated to meet the EPA test protocol standards. When timer 124 indicates the treatment cycle is complete, water may be dispensed from the CT chamber 16 by CT pump 74.

Storage tank low level switch 87 is used to signal CT pump 74 to pump water through treated water inlet 82 where it falls through ozone air gap 84 into treated water storage tank 80. Ozone air gap 84 is between the treated water inlet 82 and the water level in storage tank 80. Ozone air gap 84 should have a thickness of twice the diameter of treated water inlet 82 or a minimum of 0.5 inches. Storage tank full switch 86 signals CT pump 74 to quit transferring water when water level in treated water storage tank 80 has reached a predetermined level. Microcontroller 14 measures ozone in solution with sensor 88 or alternatively uses timer 124 to measure the length of time treated water has been in treated water storage tank 80. It can be assumed that based on local environmental conditions, water contamination can be predicted to occur in the storage tank 80 after water has been held for a predetermined period of time. Based on these conditions, microcontroller 14 may initiate a recirculation cycle inside the water treatment apparatus 10 to recirculated water from the treated water storage tank 80 back to CT chamber 16 for retreatment.

Recirculation cycle is accomplished by signaling recirculating valve 88 to direct water from water dispensing spout 90 to raw water inlet 62. Pump 92 is started by a signal from microcontroller 14 causing water to be pumped from storage tank 82 to CT chamber 16 until the recirculation level is indicated by switch 65. Ozone generator 18 supplies ozone through diffuser 38 to retreat water in CT chamber 16 as described above. It should be understood only a portion of the water in storage tank 82 may be transferred to CT chamber for retreatmerit during each recirculation cycle. Residual ozone carried in the water pumped from CT chamber 16 back to storage tank 82 after retreatment is sufficient to retreat the water and destroy microorganisms remaining in storage tank 82.

When treated water is desired from the water treatment apparatus 10, switch 93 is engaged causing a signal to be generated to initiate dispensing pump 92 to transfer treated water to water spigot 106. It should be understood, the initiation of a recirculation sequence causes the controller 14 to disable the switch 93 to prevent dispensing water while the water treatment apparatus 10 is recirculating.

Water may be treated prior to entering the CT chamber by pretreatment filter 54. Water may also be treated prior to being dispensed from water spigot 106 by posttreatment filter 104.

The present invention may be embodied in other specific forms without departing from the spirit or essential attributes thereof, and it is therefore desired that the present embodi-

I claim:

1. A water treatment apparatus comprising:
   (a) a CT chamber having a raw water inlet, a treated water outlet, an ozone inlet, a baffle adjacent the ozone inlet, and a sonic wave generator;
   (b) a treated water storage tank having a treated water inlet connected to the treated water outlet of the CT chamber, a water dispensing spout and an ozone enriched air gap adjacent the treated water inlet within the storage tank;
   (c) a means for supplying ozone connected to the CT chamber;
   (d) a means for controlling ozonization connected to the means for supplying ozone and the treated water outlet, a timer in the means for controlling ozonization; and
   (e) a dispensing valve connected to the water dispensing spout
   wherein water enters the CT chamber, is treated by ozone entering through the air inlet for a predetermined time and is transferred out the treated water outlet to the storage tank.

2. The invention of claim 1 wherein the means for supplying ozone comprises:
   (a) an air pump;
   (b) a means for drying air connected to the air pump; and
   (c) an ozone generator connected to the means for drying air having an ozone enriched air outlet connected to the air inlet whereby air is pumped from the environment, dried by the drying means and enriched with ozone generated by the ozone generator before being transferred to the CT chamber.

3. The invention of claim 1 further comprising an air diffuser connected to the air inlet.

4. The invention of claim 1 wherein the CT chamber further comprises a raw water solenoid valve connected to the raw water inlet.

5. The invention of claim 1 wherein the treated water outlet further comprises a CT pump whereby the CT pump transfers treated water from the CT chamber to the treated water storage tank.

6. The invention of claim 5 wherein the means for controlling ozonization further comprises a microcontroller, a CT timer in the microcontroller, whereby the timer measures the time of water treatment in the CT chamber.

7. The invention of claim 1 wherein the treated water storage tank further comprises:
   (a) a dispensing pump in the storage tank, the dispensing pump connected to a recirculating valve;
   (b) a water spigot connected to the dispensing valve; and
   (c) a recirculation pipe connected to the recirculating valve, the recirculation pipe in fluid communication with the raw water inlet whereby water in the treated water storage tank is dispensed by the dispensing pump and directed by the recirculation valve to the water spigot or the raw water inlet.

8. The invention of claim 1 wherein the storage tank further comprises a storage tank full switch connected to the means for controlling and a storage tank low level switch connected to the means for controlling.

9. The invention of claim 1 wherein the CT chamber further comprises a CT ozone sensor.

10. The invention of claim 1 wherein the means for controlling ozonization further comprises a remote connection.

11. The invention of claim 1 wherein the raw water inlet further comprises a pretreatment filter whereby raw water passes through the pretreatment filter prior to entering the CT chamber.

12. The invention of claim 1 wherein the water dispensing spout further comprises a posttreatment filter whereby treated water from the treated water storage tank passes through the posttreatment filter.

13. The invention of claim 1 wherein the water treatment apparatus further comprises an ozone destroying device in fluid communication with the CT chamber.

14. The invention of claim 1 wherein the treated water storage tank further comprises an ozone sensor in the water storage tank connected to the means for controlling ozonization whereby the level of ozone in solution in the treated water storage tank is detected.

15. A water treatment apparatus comprising:
   (a) a CT chamber having a raw water inlet, a treated water outlet and an ozone inlet, a diffuser on the ozone inlet, a raw water solenoid valve on the raw water inlet, a CT pump on the treated water outlet and a baffle adjacent the ozone inlet;
   (b) a treated water storage tank having a treated water inlet connected to the treated water outlet of the CT chamber, a water dispensing spout, a dispensing valve on the dispensing spout and an ozone enriched air gap adjacent the treated water inlet;
   (c) an ozone generator connected to the ozone inlet; and
   (d) a means for controlling ozonization connected to the raw water solenoid valve and the ozone generator, a timer in the means for controlling ozonization whereby the water enters the CT chamber through the raw water inlet and is treated by ozone from the ozone generator entering the CT chamber through the ozone inlet and diffused into the water through the diffuser for a predetermined period of time, the treated water is pumped by the CT pump to the storage tank where it is dispensed by opening the dispensing valve on the dispensing spout.

16. The invention of claim 15 wherein the water treatment apparatus further comprises an ozone destroying device in fluid communication with the CT chamber.

17. The invention of claim 16 wherein the means for controlling ozonization further comprises a remote connection to an outside device.

18. The invention of claim 15 further comprising a sonic wave generator in the CT chamber.

19. A water treatment apparatus comprising:
   (a) a CT chamber having a raw water inlet, a treated water outlet, a CT low level switch, a CT full switch and an ozone inlet, a raw water solenoid valve on the raw water inlet, a diffuser on the ozone inlet, a sonic wave generator in the CT chamber;
   (b) a treated water storage tank having a treated water inlet, an ozone enriched air blanket, a full switch and a water dispensing spout, an ozone enriched air gap intermediate the treated water inlet and the water dispensing spout, a dispensing pump connected to the water dispensing spout, a recirculating valve connected to the dispensing pump, the recirculating valve in fluid communication with the raw water inlet, a water spigot on the recirculating valve;
   (c) an ozone generator connected to the ozone inlet, a check valve intermediate the ozone generator and the ozone inlet;

(d) a microcontroller connected to the dispensing pump and the recirculating valve, a dispensing switch connected to the microcontroller, a remote connection on the microcontroller; and (e) an ozone destroying device in fluid communication with the inside of the CT chamber whereby raw water enters the CT chamber displacing air in the CT chamber and forcing the displaced air through the means for destroying ozone, ozone is generated by the ozone generator and transferred into the CT chamber through the diffuser, the water in the CT chamber is treated with the ozone for a predetermined period of time and transferred to the treated water storage tank.

20. A water treatment apparatus comprising:

(a) a CT chamber having a raw water inlet, a treated water outlet and an ozone inlet;

(b) a treated water storage tank having a treated water inlet connected to the treated water outlet of the CT chamber, a water dispensing spout and an ozone enriched air gap adjacent the treated water inlet within the storage tank;

(c) a means for supplying ozone connected to the CT chamber;

(d) a means for controlling ozonization connected to the means for supplying ozone and the treated water outlet, a timer in the means for controlling ozonization;

(e) a dispensing vane connected to the water dispensing spout wherein water enters the CT chamber, is treated by ozone entering through the air inlet for a predetermined time and is transferred out the treated water outlet to the storage tank;

(f) a dispensing pump in the storage tank, the dispensing pump connected to a recirculation valve;

(g) a water spigot connected to the dispensing valve; and (h) a recirculation pipe connected to the recirculating valve, the recirculation pipe in fluid communication with the raw water inlet whereby water in the treated water storage tank is dispensed by the dispensing pump and directed by the recirculation valve to the water spigot or the raw water inlet.

* * * * *